Feb. 11, 1958 W. J. SCOTT 2,822,600
METHODS OF MAKING CERAMIC ARTICLES
Filed Feb. 5, 1954
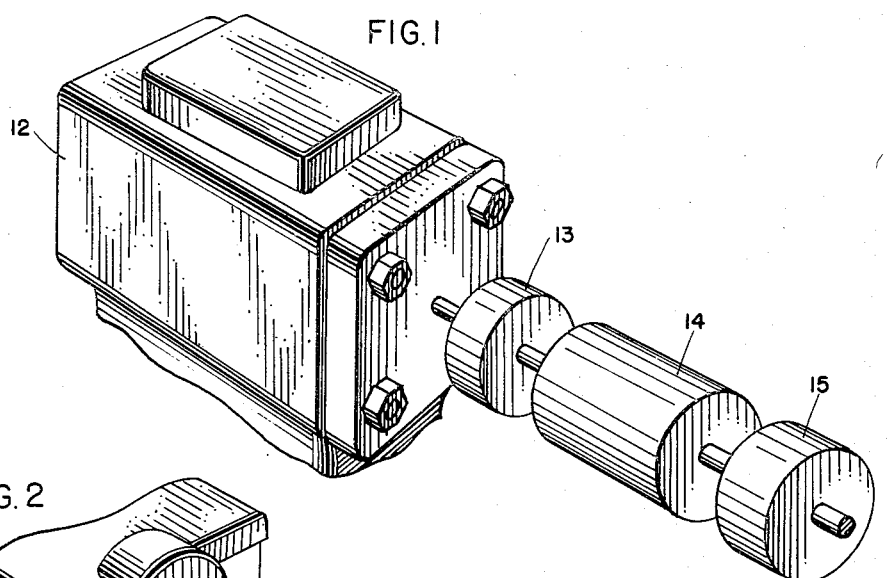
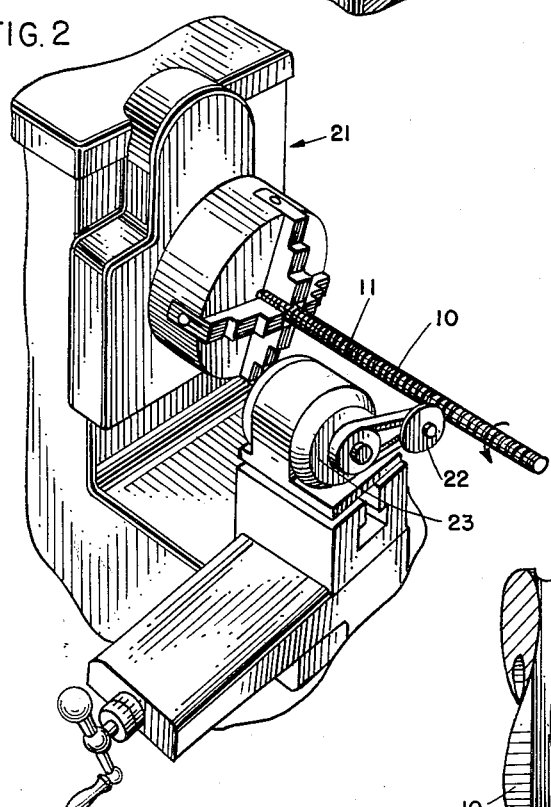
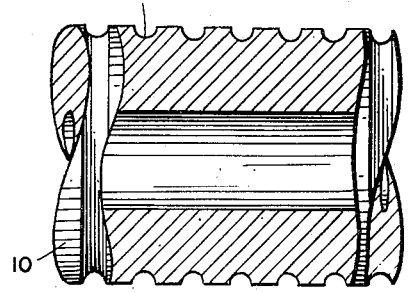
INVENTOR:
W. J. SCOTT
BY
C. B. Hamilton
ATTORNEY

2,822,600
METHODS OF MAKING CERAMIC ARTICLES

Walter J. Scott, Indianapolis, Ind., assignor to Western Electric Company, Incorporated, New York, N. Y., a corporation of New York Application February 5, 1954, Serial No. 408,364

2 Claims. (Cl. 25—156)

This invention relates to methods of making ceramic articles, and more particularly to methods of making ceramic cores on which resistance wires are to be wound to form resistances.

In the manufacture of wire wound resistors of the type which includes a ceramic core having a spiral groove therein, a resistance wire is wound around the core. The cores have been made by extruding suitable ceramic material, cutting the resulting product to length, firing the lengths, and cutting helical grooves in the resulting product. In the cutting of the grooves, the articles often are broken and much breakage and wearing out of the cutting implements occurs.

An object of the invention is to provide a new and improved method of making ceramic cores.

Another object of the invention is to provide an improved method of making ceramic cores upon which resistance wire may be wound in helical grooves in the cores to form resistors.

A further object of the invention is to provide methods of making brittle ceramic core resistors with a minimum of breakage of the core and with minimum wear on the grooving tools used in forming grooves in the cores.

In a method illustrating certain features of the invention, a wet ceramic mix is molded to the ultimate shape desired and the article is immersed in hot wax, which impregnates the molded article, after which the article, with the wax impregnated thereon, is removed from the wax. Grooves then are cut in the article, the wax preventing breakage of the article as it is so grooved, and then the article is fired to form the ceramic materials to a hard impervious mass.

A complete understanding of the invention may be obtained from the following detailed description of the method forming a specific embodiment thereof, when read in conjunction with the appended drawings, in which Fig. 1 is a fragmentary, perspective view of an article formed by a method forming one embodiment of the invention during one stage of its manufacture;

Fig. 2 is a perspective view of the article shown in Fig. 1 during a later stage of its manufacture, and Fig. 3 is a fragmentary, perspective view of the article.

Referring now in detail to the drawings, there is shown therein a core 10 composed of ceramic material impregnated with wax and fired. The core 10 has a helical groove 11 formed therein which serves to receive resistance wire to form the resulting product into a resistor. In making the core, a ceramic mix having the desired ultimate dielectric and physical properties is formed in extrudable condition and has water, aluminum oxide and the like therein. This mix is placed into an extruder 12 of a well-known type, whch extrudes the mix continuously into the form of an elongated tube, which is advanced, either by a suitable conveyor belt or by the force of the extrusion, through a drier 13 to dry the core, a waxing chamber 14 to impregnate the core with petroleum wax, which has a hardness in between that of beeswax and "Halo-wax" (chlorinated paraffin) at a temperature of 250° F., and then a cooler 15, which solidifies the wax. While the core is in the waxing chamber 14, the wax enters all the pores in the ceramic mix and impregnates the core thoroughly. The chamber 14 may be provided with entrance and exit seals and be used as a bath or it may utilize spraying of the wax.

As the wax cools to near room temperature (70° F.) the wax solidifies to provide rigidity to the tubular core. After the tubular core has been so cooled, it is cut to desired lengths, which are chucked in a lathe 21 or other suitable grooving device, and the groove 11 is formed helically in the article, the article beng grooved by a formed abrasive cutting wheel 22 of tungsten carbide, or the like, driven by an electric motor 23. The material is cut very easily inasmuch as it is composed of wax and unfired ceramic material while the wax serves to provide rigidity and shear strength to the core so that it can withstand the cutting action without undesirable deformation. After the core has been grooved, it is placed in a furnace and is heated to a temperature of about 2400° F., firing the ceramic mix to make a hard, dry strong article having a groove in which the resistance wire may be fixed.

In a method forming an alternative embodiment of the invention, the core is extruded wet, and is passed directly into a waxing chamber in which the hot wax is applied to the wet core to dry the core and impregnate it with the wax. The subsequent steps of this method are identical with the corresponding steps of the first-described method.

In a method forming another embodiment of the invention, the core of wet ceramic material is extruded, cut into suitable lengths, and dried. The lengths are immersed in a bath of petroleum wax, removed and cooled, after which the cores are grooved and fired as in the first method described hereinabove.

The above methods form resistor cores of hard ceramic material with a minimum breakage of the cores and with a minimum of maintenance on grooving tools and the like. While the above-described methods illustrate only the formation of grooves in ceramic resistor cores, it is obvious that any ceramic article which requires external or internal threads, or other types of relieved portions, can be manufactured by this method, wherein the grooving and cutting of the article is effected prior to the firing of the article, at which time the material is sufficiently soft. Hence, inexpensive cutting tools may be used without extensive maintenance.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of forming tubular ceramic articles of a predetermined configuration which comprises preparing a water and ceramic mix susceptible of being extruded and maintaining a tubular shape, extruding the mix to form a tube, impregnating the moist tube with a molten wax at a temperature that is sufficiently high so that drying results from the impregnation, cutting the tube into lengths, shaping each length of wax impregnated tubular ceramic into the predetermined configuration, and then firing the formed tubular article to drive out the wax and fuse the ceramic.

2. The method of forming tube resistor cores, which comprises continuously extruding an aqueous ceramic mix in the form of a tube, cutting the tube to core lengths, applying molten wax to the core lengths while still undried for a sufficient period of time to heat the core lengths to the temperature of the molten wax to dry and impregnate the core lengths, cooling the core lengths to solidify the wax thereon, cutting helical grooves in the cooled core lengths, and firing the core lengths.

References Cited in the file of this patent

UNITED STATES PATENTS

| | | |
|---|---|---|
| 2,365,535 | Fischer | Dec. 19, 1944 |

FOREIGN PATENTS

| | | |
|---|---|---|
| 519,885 | Great Britain | Apr. 9, 1940 |